United States Patent
Lim et al.

(10) Patent No.: US 7,671,925 B2
(45) Date of Patent: Mar. 2, 2010

(54) CIRCUITS, METHODS, AND COMPUTER PROGRAM PRODUCTS FOR REDUCING CROSS-COLOR ARTIFACTS IN VIDEO DATA

(75) Inventors: Hyung-Jun Lim, Gyeonggi-do (KR);
Sung-Cheol Park, Seoul (KR);
Jae-Hong Park, Gyeonggi-do (KR);
Kyoung-Mook Lim, Gyeonggi-do (KR);
Heo-Jin Byeon, Gyeonggi-do (KR);
Jae-Hong Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1053 days.

(21) Appl. No.: 11/353,838

(22) Filed: Feb. 14, 2006

(65) Prior Publication Data

US 2006/0197878 A1     Sep. 7, 2006

(30) Foreign Application Priority Data

Feb. 14, 2005     (KR)     ...................... 10-2005-0011909

(51) Int. Cl.
*H04N 9/74*     (2006.01)
*H04N 5/00*     (2006.01)

(52) U.S. Cl. ...................................... 348/609; 348/663

(58) Field of Classification Search ......... 348/637–670, 348/186, 609, 610
See application file for complete search history.

(56) References Cited

U.S. PATENT DOCUMENTS

| | | | |
|---|---|---|---|
| 4,644,389 A | 2/1987 | Nakagawa et al. | |
| 5,122,863 A * | 6/1992 | Zortea | 348/186 |
| 5,905,531 A * | 5/1999 | Chiba | 348/241 |
| 7,123,308 B2 * | 10/2006 | Uchida | 348/649 |
| 2004/0109089 A1 | 6/2004 | Yang-Hong et al. | |

FOREIGN PATENT DOCUMENTS

| | | |
|---|---|---|
| EP | 1 347 654 A2 | 9/2003 |
| JP | 09-200792 | 7/1997 |

* cited by examiner

*Primary Examiner*—M. Lee
(74) *Attorney, Agent, or Firm*—Myers Bigel Sibley & Sajovec, P.A.

(57) ABSTRACT

A circuit for reducing cross-color artifacts in video data can include three luminance/chrominance (Y/C) separator circuits each configured to provide sets of chrominance coordinates based on a respective three contiguous composite video frames. A first circumcircle calculator circuit is coupled to the three Y/C separator circuits and is configured to provide a circumcircle for a set of chrominance coordinates corresponding to the first, second and third contiguous composite video frames. A second circumcircle calculator circuit is coupled to the three Y/C separator circuits and is configured to provide a circumcircle for a set of chrominance coordinates corresponding to the second and third contiguous composite video frames and a fourth contiguous composite video frame. Related methods and computer program products are also disclosed.

17 Claims, 8 Drawing Sheets

CIRCUITS, METHODS, AND COMPUTER PROGRAM PRODUCTS FOR REDUCING CROSS-COLOR ARTIFACTS IN VIDEO DATA

CROSS-REFERENCE TO RELATED PATENT APPLICATION

This application claims the benefit of Korean Patent Application No. 10-2005-0011909, filed on Feb. 14, 2005, in the Korean Intellectual Property Office, the disclosure of which is incorporated herein in its entirety by reference.

FIELD OF THE INVENTION

The present invention relates to separation of luminance and chrominance components from a composite video signal.

BACKGROUND

In general, NTSC/PAL color television systems transmit a composite video signal obtained by multiplexing a luminance signal (Y) and a chrominance signal (C) quadrature-amplitude-modulated to a subcarrier frequency. A receiver should separate the luminance signal Y and the chrominance signal C from the composite video signal using an appropriate method in order to facilitate image display and signal processing.

FIG. 1 represents a composite video signal (CVBS, Composite Video with Blanking and Synchronization signal) and luminance and chrominance signals Y and C separated from the composite video signal CVBS. Referring to FIG. 1, a high-frequency chrominance signal C remains in a portion A of the separated luminance signal Y.

FIG. 2 is a diagram for explaining an example of separating Y/C from a composite video signal CVBS of a still video. Referring to FIG. 2, the composite video signal CVBS of the Nth frame of the still video corresponds to the sum of the luminance signal Y and the chrominance signal C. The composite video signal CVBS of the (N+1)th frame corresponds to a signal obtained by subtracting the chrominance signal C from the luminance signal Y. That is, the luminance signal Y of the composite video signal CVBS of the (N+1)th frame has the same phase as that of the luminance signal of the composite video signal CVBS of the Nth frame but the chrominance signal C has a phase opposite to that of the chrominance signal C of the composite video signal CVBS of the Nth frame. It may be relatively simple to separate the luminance signal Y and the chrominance signal C from the composite video signal CVBS of the still video using a complementary Y/C separation method.

FIG. 3 is a diagram for explaining an example of separating Y/C from a composite video signal CVBS of a moving image. Referring to FIG. 3, the composite video signal CVBS of the (N+1)th frame of the moving image is delayed from the composite video signal CVBS of the Nth frame by T/2. Accordingly, the luminance signal Y and the chrominance signal C of the composite video signal CVBS of the (N+1)th frame have phases opposite to the phases of the luminance signal Y and the chrominance signal C of the composite video signal CVBS of the Nth frame. In this case, it may not be as simple to separate the luminance signal Y and the chrominance signal C from the composite video signal CVBS of the moving image using the complementary Y/C separation method.

FIG. 4 is a diagram for explaining another example of separating Y/C from a composite video signal CVBS of a moving image having relatively high levels of motion. Referring to FIG. 4, it may be difficult to separate Y/C from the composite video signal CVBS of the moving image with this level of motion only using the Nth frame and the (N+1)th frame. In this case, Y/C separation can be performed using the (N+2)th frame in addition to the Nth and (N+1)th frames, which may be more complicated than the other approaches described above.

Some conventional Y/C separation techniques use a spatial filter and a spatio-temporal filter. The spatial filter can be simpler and cheaper than the spatio-temporal filter. The spatio-temporal filter can improve the performance of the spatial filter because it uses correlation on the time axis of a video signal. Recently, a spatio-temporal Y/C separation filter has been popularized because of demands for images with high picture quality.

However, according to FIG. 5, when an RF component of the luminance signal Y and an RF component of the chrominance signal C are disposed in the same spectrum band, it may be difficult to separate the luminance signal Y and the chrominance signal C even when a high-performance spatio-temporal Y/C separation filter is used.

When Y/C separation is not properly performed, cross-luma and cross-color artifacts may occur. The cross-luma occurs when a C component exists in the separated luminance signal Y resulting in dotted artifacts. The cross-luma artifact may not be obvious due to characteristics of display devices and the human eye. The cross-color occurs when a Y component exists in the separated chrominance signal C resulting in a rainbow pattern artifact. When the cross-color artifact is generated, colors are changed for every frame to be unpleasant to the eye.

SUMMARY

Embodiments according to the invention can provide circuits, methods, and computer program products for reducing cross-color artifacts in video data. Pursuant to these embodiments, a cross-color artifact removing circuit can include 2-dimensional Y/C separators respectively receiving at least three frames of a composite video signal and respectively separating chrominance signals from the frames. A circumcircle calculator can transform the separated chrominance signals output from the 2-dimensional Y/C separators into UV coordinate values and calculate the radius and center of a circumcircle circumscribing the UV coordinate values, wherein the center of the circumcircle is output as an actual chrominance signal to minimize cross-color artifact.

In some embodiments according to the invention, each of the 2-dimensional Y/C separators in the NTSC standard includes a low pass filter receiving the composite video signal and separating a frequency of lower than 3.0 MHz as a luminance signal. A high pass filter receives the composite video signal and separates a frequency of higher than 3.0 MHz as the chrominance signal.

In some embodiments according to the invention, each of the 2-dimensional Y/C separators in the PAL standard includes a low pass filter receiving the composite video signal and separating a frequency of lower than 3.8 MHz as a luminance signal. A high pass filter receives the composite video signal and separates a frequency of higher than 3.8 MHz as the chrominance signal.

In some embodiments according to the invention, a cross-color artifact removing circuit includes a first 2-dimensional Y/C separator that receives the Nth frame (N≧1) of a composite video signal and separates a first chrominance signal from the Nth frame. A second 2-dimensional Y/C separator receives the (N+1)th frame of the composite video signal and separates a second chrominance signal from the (N+1)th frame. A third 2-dimensional Y/C separator receives the (N+2)th frame of the composite video signal and separates a third chrominance signal from the (N+2)th frame. A plurality of circumcircle calculators transform the first, second and third chrominance signals separated from every three continuous frames of the composite video signal into UV coordinate values and calculate the radiuses of circumcircles circumscribing the UV coordinate values for every three continuous frames. A selector selects the circumcircle having the smallest radius from the circumcircles and outputs the center of the selected circumcircle as an actual chrominance signal.

In some embodiments according to the invention, each of the first, second and third 2-dimensional Y/C separators in the NTSC standard includes a low pass filter receiving the composite video signal and separating a frequency of lower than 3.0 MHz as a luminance signal. A high pass filter receives the composite video signal and separates a frequency of higher than 3.0 MHz as the chrominance signal.

In some embodiments according to the invention, a cross-color artifact removing method includes receiving at least three continuous frames of a composite video signal and respectively separating chrominance signals from the three continuous frames. The chrominance signals separated from the frames are transformed into UV coordinate values. The radiuses and centers of circumcircles circumscribing the UV coordinate values are calculated and the circumcircle having the smallest radius is selected from the circumcircles and outputting the center of the selected circumcircle as an actual chrominance signal.

In some embodiments according to the invention, the chrominance signals are separated using a high pass filter that receives the composite video signal and filters a frequency of higher than 3.0 MHz in an NTSC system. In some embodiments according to the invention, the chrominance signals are separated using a high pass filter that receives the composite video signal and filters a frequency of higher than 3.8 MHz in a PAL system.

In some embodiments according to the invention, a method of reducing cross-color artifacts in video data includes determining a smallest radius of at least three circumcircles circumscribing UV coordinate values corresponding to at least three contiguous frames of video data in a composite video signal. In some embodiments according to the invention, the method further includes providing a center of the selected smallest radius of the at least three circumcircles as a separated chrominance signal.

In some embodiments according to the invention, determining a smallest radius of at least three circumcircles circumscribing UV coordinate values includes separating a first chrominance signal from a first video frame of data, separating a second chrominance signal from a second video frame of data, and separating a third chrominance signal from a third video frame of data. The first, second, and third chrominance signals are provided to a first circumcircle calculator to determine first, second, and third radii for respective circumcircles corresponding to the first, second, and third chrominance signals.

In some embodiments according to the invention, determining a smallest radius of at least three circumcircles circumscribing UV coordinate values includes determining a smallest radius of at least two of the three circumcircles and a radius of a next circumcircle circumscribing UV coordinate values corresponding to the next contiguous frame of video data in the composite video signal.

In some embodiments according to the invention, a chrominance separation circuit includes three luminance/chrominance (Y/C) separator circuits each configured to provide sets of chrominance coordinates based on a respective three contiguous composite video frames. A first circumcircle calculator circuit is coupled to the three Y/C separator circuits and is configured to provide a circumcircle for a set of chrominance coordinates corresponding to the first, second and third contiguous composite video frames. A second circumcircle calculator circuit is coupled to the three Y/C separator circuits and is configured to provide a circumcircle for a set of chrominance coordinates corresponding to the second and third contiguous composite video frames and a fourth contiguous composite video frame.

In some embodiments according to the invention, the circuit further includes a third circumcircle calculator circuit coupled to the three Y/C separator circuits and configured to provide a circumcircle for a set of chrominance coordinates corresponding to the third and fourth contiguous composite video frames and a fifth contiguous composite video frame.

In some embodiments according to the invention, the circuit further includes a selector circuit coupled to the first, second, and third circumcircle calculator circuits and configured to select a minimum radius among the circumcircles. In some embodiments according to the invention, the three Y/C separator circuits and the first and second circumcircle calculator circuits include a highpass filter circuit configured to provide the chrominance signals including a narrowband luminance signal.

DESCRIPTION OF EMBODIMENTS ACCORDING TO THE INVENTION

Figure 1:
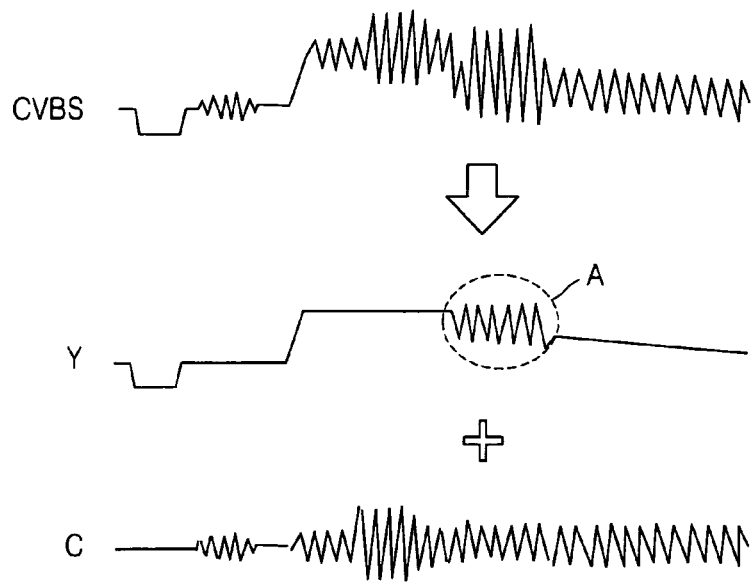
FIG. 1 illustrates a composite video signal, and luminance and chrominance signals Y and C separated from the composite video signal.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is described below with reference to diagrams (such as schematic illustrations) and/or operational illustrations of methods, devices, and computer program products according to embodiments of the invention. It is to be understood that the functions/acts noted in the figures may occur out of the order noted in the operational illustrations. For example, two elements shown in succession may in fact be executed substantially concurrently or the elements may sometimes be executed in the reverse order, depending upon the functionality/acts involved.

The present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code or "code" for carrying out operations according to the present invention may be written in an object oriented programming language such as JAVA®, Smalltalk or C++, JavaScript, Visual Basic, TSQL, Perl, or in various other programming languages. Software embodiments of the present invention do not depend on implementation with a particular programming language. Portions of the code may execute entirely on one or more systems utilized by an intermediary server.

The computer program code may be provided to a processor of a general purpose computer, special purpose computer, or other programmable data processing apparatus as instructions to produce a machine, such that the instructions, which execute via the processor of the computer or other programmable data processing apparatus, create means for implementing the functions specified in the illustrations.

The computer code may be stored in a computer-readable memory that can direct a computer or other programmable data processing apparatus to function in a particular manner, such that the instructions stored in the computer-readable memory produce an article of manufacture including instruction means which implement the function specified in the illustrations.

Figure 6:
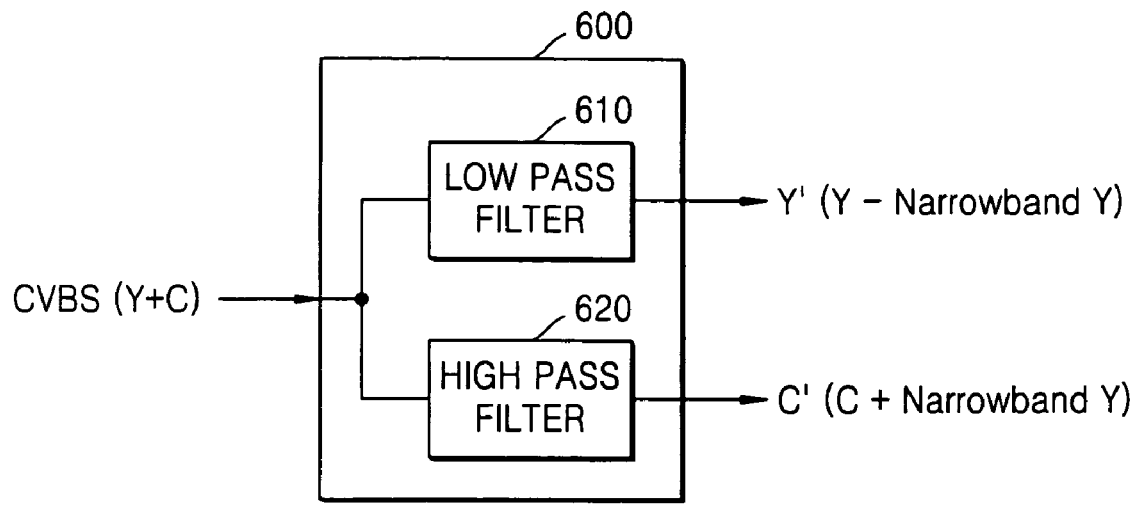
FIG. 6 is a block diagram of a 2-dimensional Y/C separator according to some embodiments of the invention.

FIG. 6 is a block diagram of a 2-dimensional Y/C separator 600. Referring to FIG. 6, the 2-dimensional Y/C separator 600 receives a composite video signal CVBS and separates a luminance signal Y' and a chrominance signal C' from the composite video signal CVBS. The 2-dimensional Y/C separator 600 includes a low pass filter 610 and a high pass filter 620. The low pass filter 610 receives the composite video signal CVBS and separates a frequency of lower than 3.0 MHz (NTSC) or 3.8 MHZ (PAL) from the composite video signal CVBS as the luminance signal Y'. The high pass filter 620 receives the composite video signal CVBS and separates a frequency of higher than 3.0 MHz (NTSC) or 3.8 MHZ (PAL) from the composite video signal CVBS as the chrominance signal C'. The separated luminance signal Y' includes a narrow band luminance signal $Y_{Narrowband}$ in addition to the original luminance signal Y. The separated luminance signal Y' further includes a broad band luminance signal (not shown). The separated chrominance signal C' includes the narrow band luminance signal $Y_{Narrowband}$ in addition to the original chrominance signal C. The original chrominance signal C is defined as follows.

$$C=U\cos(\omega t)+V\sin(\omega t) \quad \text{[Equation 1]}$$

The narrow band luminance signal $Y_{Narrowband}$ is defined as follows.

$$Y_{Narrowband}=A_Y\cos(\omega t+\theta_Y)=(A_Y\cos\theta_Y)\cos(\omega t)+(A_Y\sin\theta_Y)\sin(\omega t) \quad \text{[Equation 2]}$$

The separated chrominance signal C' is defined from Equations 1 and 2 as follows.

$$C'=C+Y_{Narrowband}(U+A_Y\cos\theta_Y)\cos(\omega t)+(V+A_Y\sin\theta_Y)\sin(\omega t) \quad \text{[Equation 3]}$$

Figure 7:
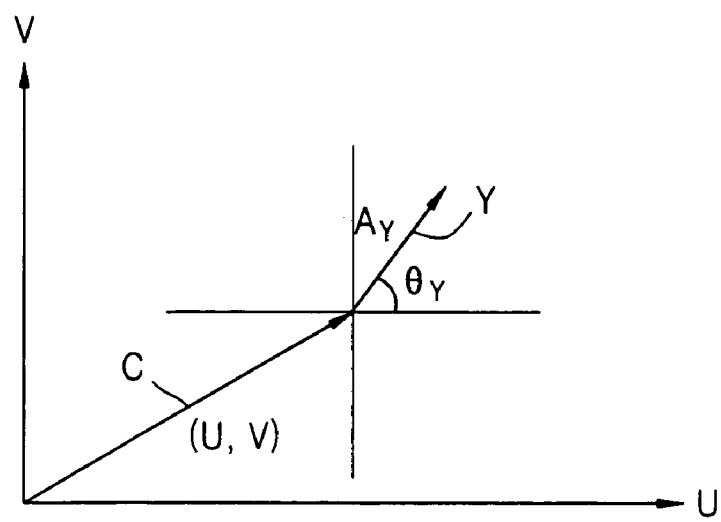
FIG. 7 illustrates cross-color artifact in UV coordinates.

The separated chrominance signal C' including the narrow band luminance signal $Y_{Narrowband}$ appears as cross-color artifact. FIG. 7 illustrates the cross-color artifact in UV coordinates.

Figure 2:
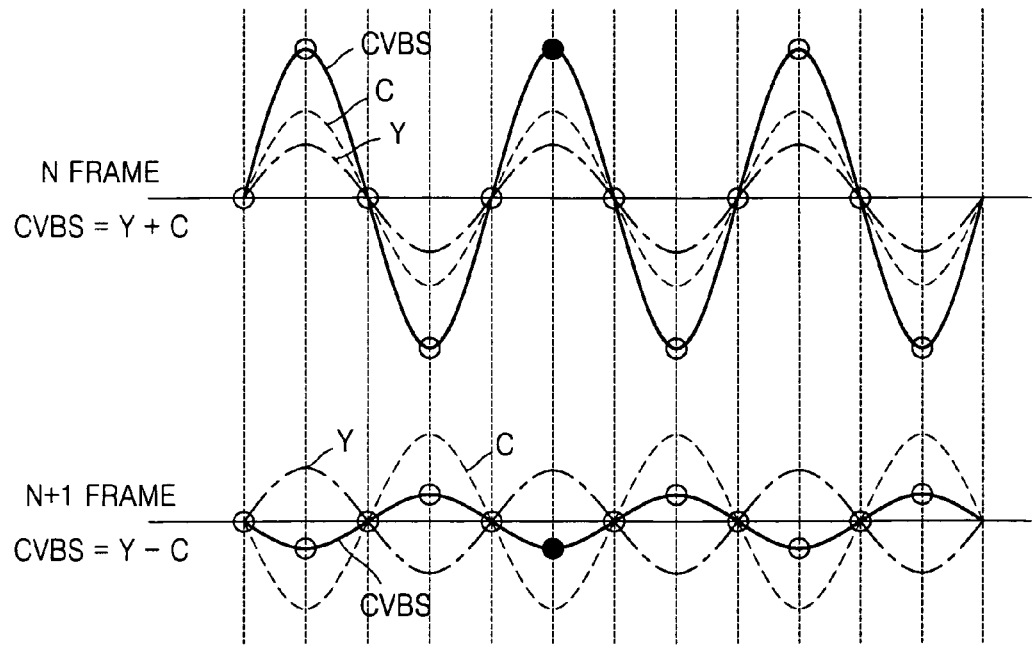
FIG. 2 is a diagram for explaining an example of separating luminance and chrominance signals from a composite video signal a still video.
Figure 3:
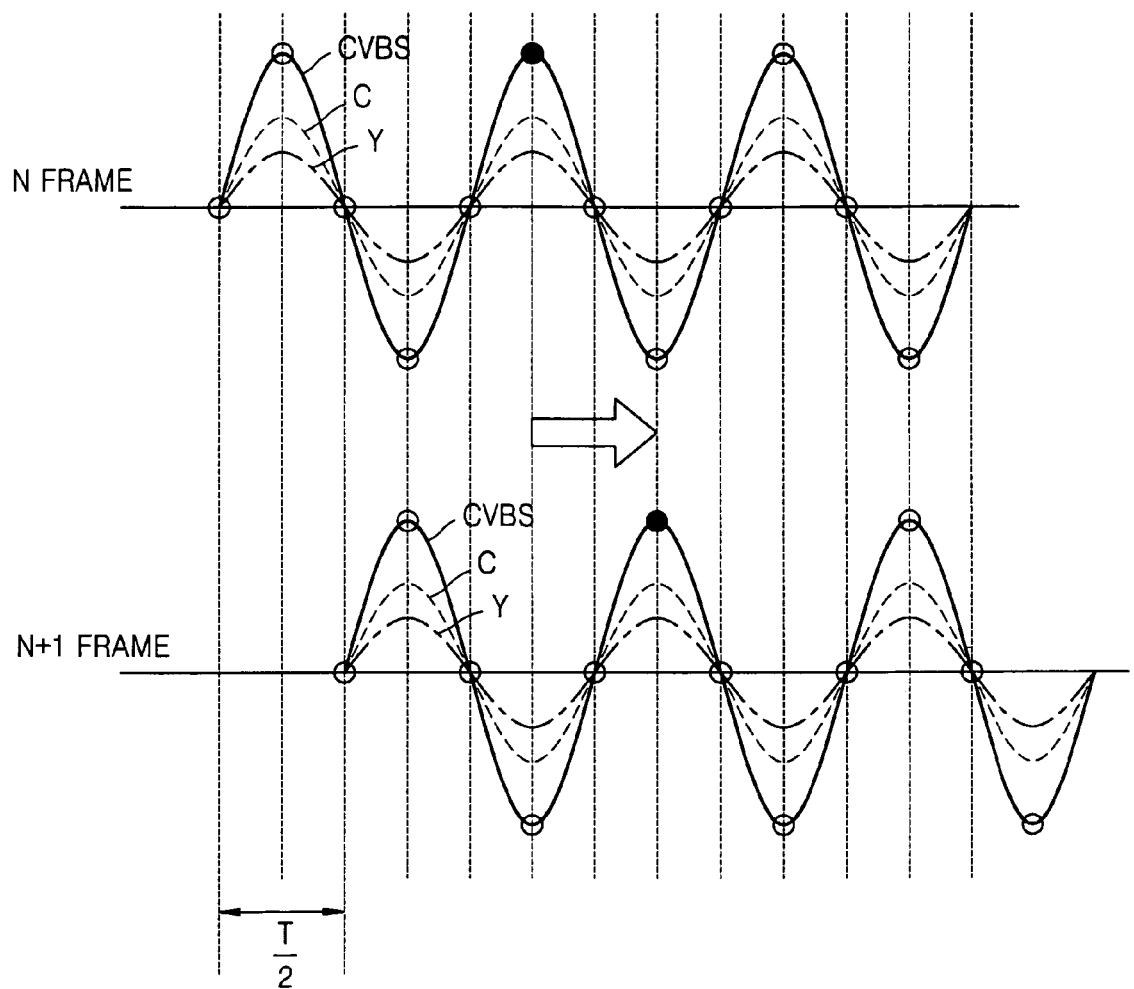
FIG. 3 is a diagram for explaining an example of separating luminance and chrominance signals from a composite video signal a moving image.
Figure 4:
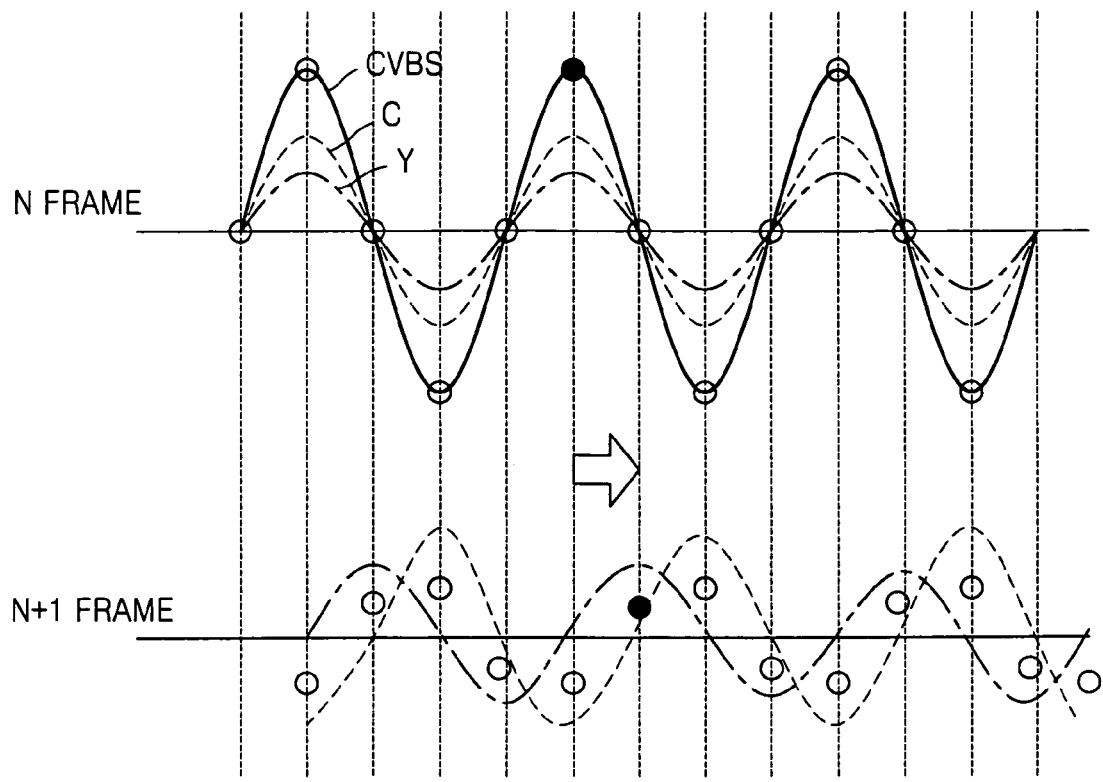
FIG. 4 is a diagram for explaining another example of separating luminance and chrominance signals from a composite video signal a moving image.
Figure 5:
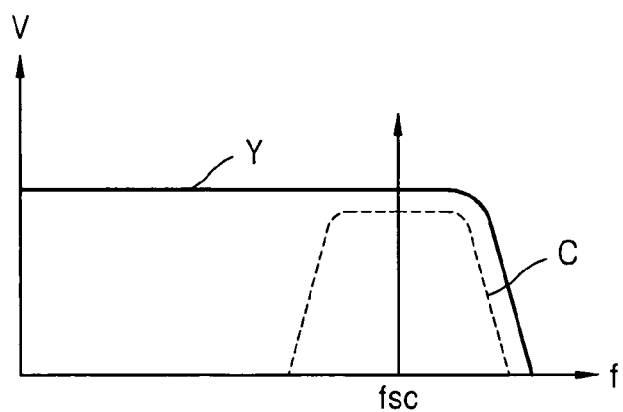
FIG. 5 illustrates a frequency spectrum of a composite video signal.
Figure 8:
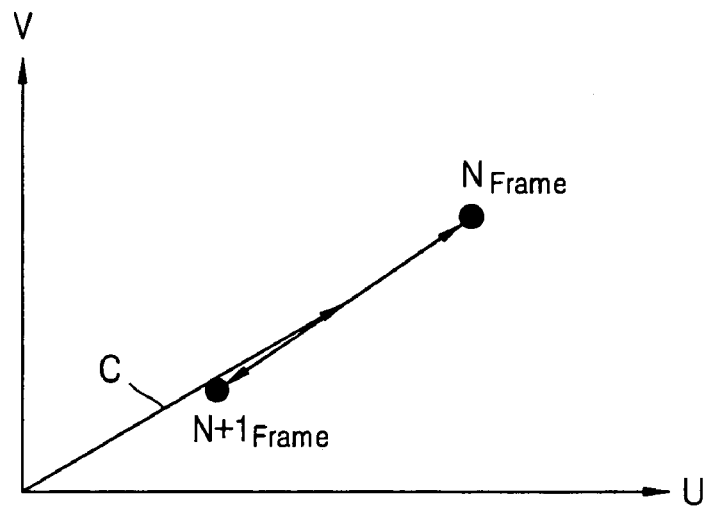
FIG. 8 illustrates the still video of FIG. 2 in UV coordinates.
Figure 9:
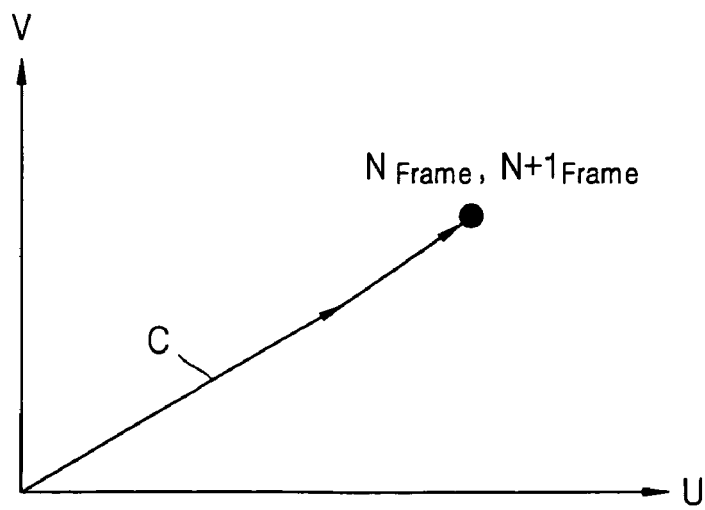
FIG. 9 illustrates the moving image of FIG. 3 in UV coordinates.
Figure 10:
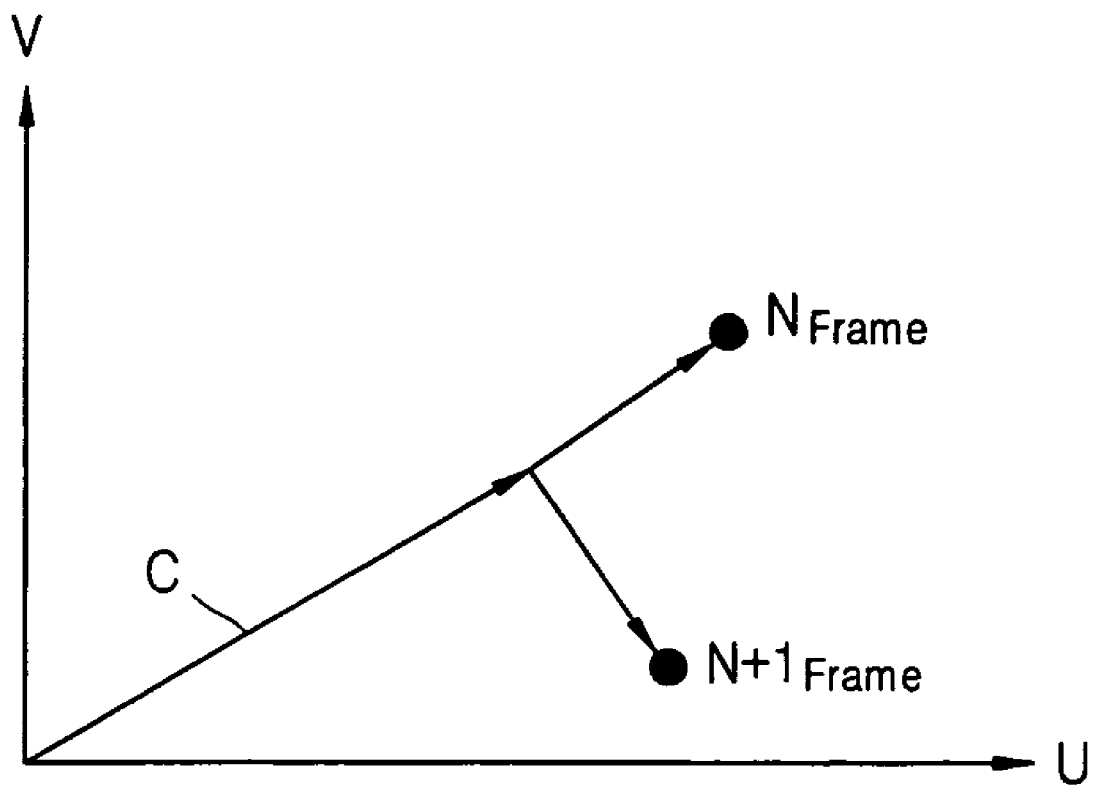
FIG. 10 illustrates the moving image of FIG. 4 in UV coordinates.

FIG. 8 illustrates the still video of FIG. 2 in the UV coordinates, FIG. 9 illustrates the moving image of FIG. 3 in the UV coordinates, and FIG. 10 illustrates the moving image of FIG. 4 in the UV coordinates. Referring to FIG. 8, the Nth frame and the (N+1)th frame of the still video have a phase difference of 180° between them on the basis of the chrominance signal C. Referring to FIG. 9, the Nth frame and the (N+1)th frame delayed from the Nth frame by T/2 of the moving image have no phase difference between them. Referring to FIG. 10, the Nth frame and the (N+1)th frame of the moving image having lots of motions have a predetermined phase difference between them on the basis of the chrominance signal C. The cross-color artifact can be minimized using the Nth frame dot and the (N+1)th frame dot displayed on the UV coordinates.

Figure 11:
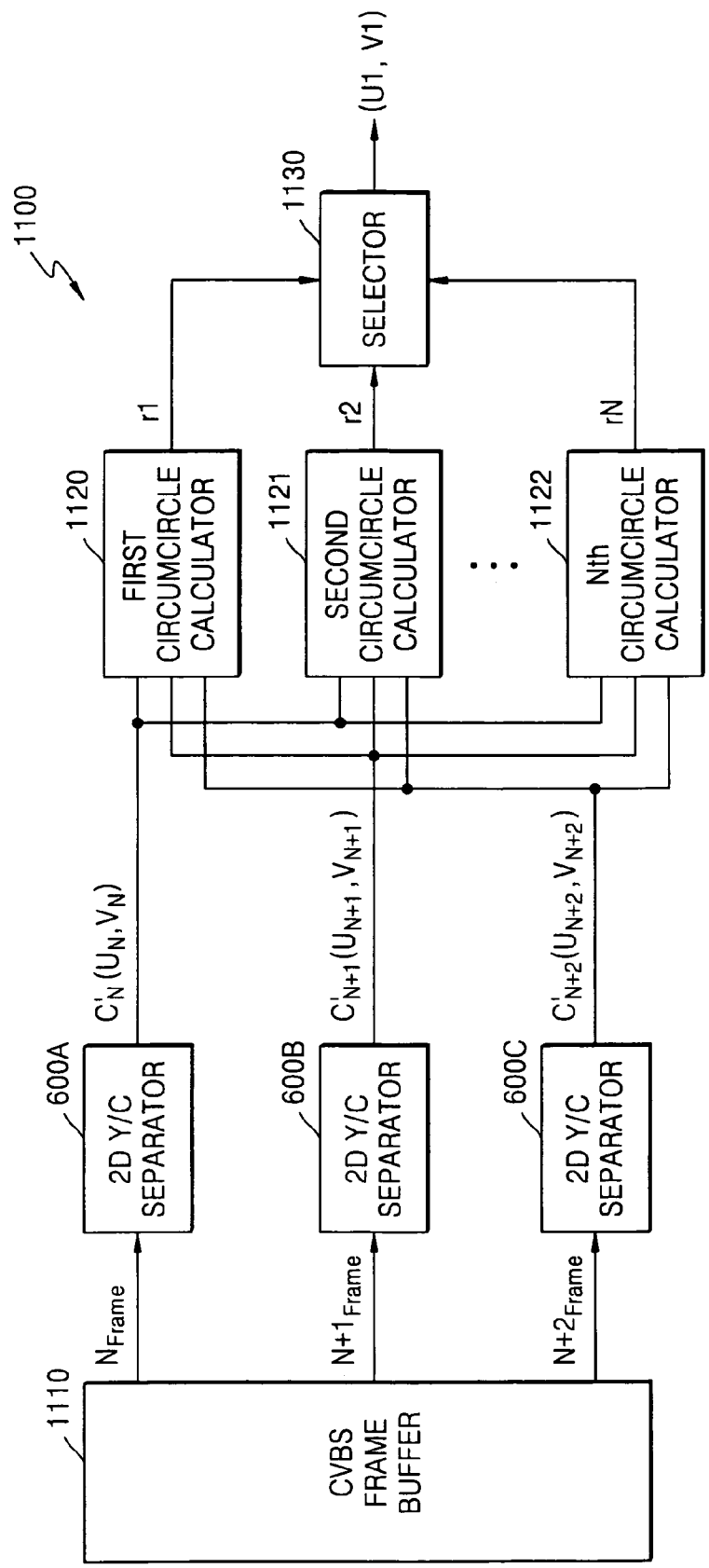
FIG. 11 is a block diagram of a cross-color artifact removing circuit according to some embodiments of the present invention.

FIG. 11 is a block diagram of a cross-color artifact removing circuit 1100 according to an embodiment of the present invention. Referring to FIG. 11, the cross-color artifact removing circuit 1100 includes a CVBS frame buffer 1110, 2-dimensional Y/C separators 600A, 600B and 600C, a plurality of circumcircle calculators 1120, 1121 and 1122, and a selector 130. The CVBS frame buffer 1110 stores received video data and respectively transmits the Nth frame data (N≧1), the (N+1)th frame data and the (N+2)th frame data to the 2-dimensional Y/C separators 600A, 600B and 600C. That is, the CVBS frame buffer 1110 sequentially transmits three continuous frame data, for example, the Nth frame data-(N+1)th frame data-(N+2)th frame data, the (N+1)th frame data-(N+2) frame data-the (N+3)th frame data and so on to the 2-dimensional Y/C separators 600A, 600B and 600C. The 2-dimensional Y/C separators 600A, 600B and 600C are identical to the 2-dimensional Y/C separator 600 shown in FIG. 6.

The first 2-dimensional Y/C separator 600A receives the Nth frame data and separates luminance and chrominance signals from the Nth frame data. The chrominance signal separated from the Nth frame data is called a first cross-color artifact $C'_N$. The second 2-dimensional Y/C separator 600B receives the (N+1)th frame data and separates luminance and chrominance signals from the (N+1)th frame data. The chrominance signal separated from the (N+1)th frame data is called a second cross-color artifact $C'_{N+1}$. The third 2-dimensional Y/C separator 600C receives the (N+2)th frame data and separates luminance and chrominance signals from the (N+2)th frame data. The chrominance signal separated from the (N+2)th frame data is called a third cross-color artifact $C'_{N+2}$. The first cross-color artifact $C'_N$ is represented as a point $(U_N, V_N)$ in the UV coordinates, the second cross-color artifact $C'_{N+1}$ is represented as a point $(U_{N+1}, V_{N+1})$ in the UV coordinates, and the third cross-color artifact $C'_{N+2}$ is represented as a point $(U_{N+2}, V_{N+2})$ in the UV coordinates.

Figure 12:
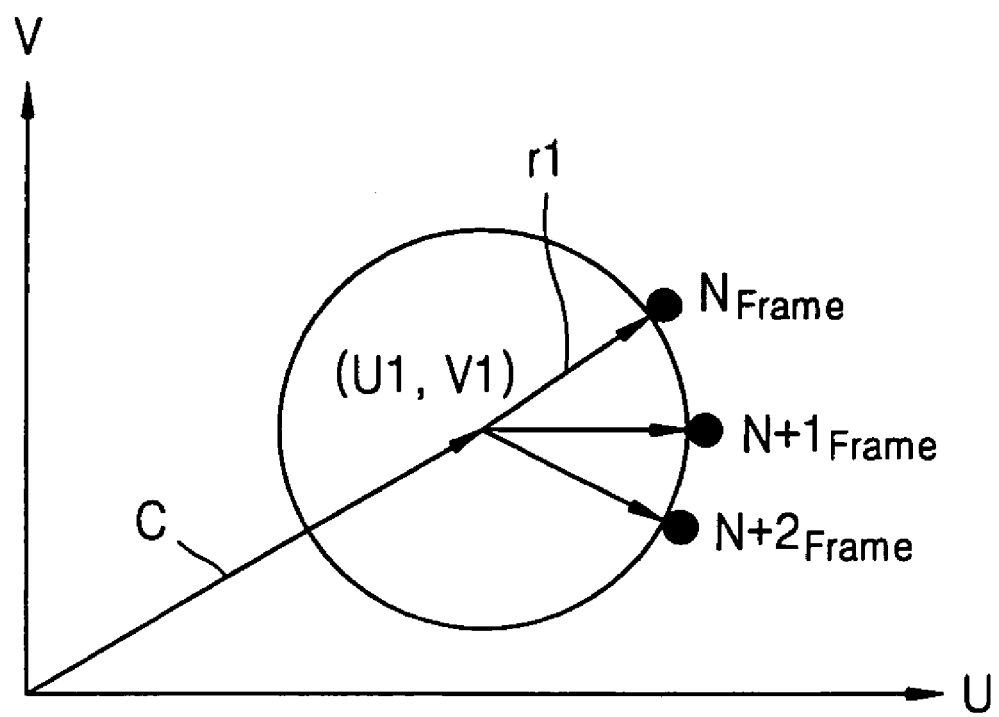
FIG. 12 illustrates the operation of one of the circumcircle calculators shown in FIG. 11 in UV coordinates according to some embodiments of the present invention.

The first circumcircle calculator 1120 receives the UV coordinate values $(U_N, V_N)$, $(U_{N+1}, V_{N+1})$ and $(U_{N+2}, V_{N+2})$ of the first, second and third cross-color artifacts $C'_N$, $C'_{N+1}$ and $C'_{N+2}$ corresponding to the first, second and third frame data and calculates the radius of a circle circumscribing the UV coordinate values $(U_N, V_N)$, $(U_{N+1}, V_{N+1})$ and $(U_{N+2}, V_{N+2})$. The center (U1, V1) and the radius r1 of a first circumcircle shown in FIG. 12 are represented as follows.

$$U1 = \frac{\begin{array}{l}(V_{N+1} - V_{N+2})(U_N - U_{N+1})(U_N + U_{N+1}) - \\ (V_N - V_{N+1})(U_{N+1} - U_{N+2})(U_{N+1} + U_{N+2}) - \\ (V_N - V_{N+1})(V_{N+1} - V_{N+2})(V_{N+2} - V_N)\end{array}}{\begin{array}{l}2(U_N - U_{N+1})(V_{N+1} - V_{N+2}) - \\ 2(U_{N+1} - U_{N+2})(V_N - V_{N+1})\end{array}}$$ [Equation 4]

$$V1 = \frac{\begin{array}{l}(U_{N+1} - U_{N+2})(V_N - V_{N+1})(V_N + V_{N+1}) - \\ (U_N - U_{N+1})(V_{N+1} - V_{N+2})(V_{N+1} + V_{N+2}) - \\ (U_N - U_{N+1})(U_{N+1} - U_{N+2})(U_{N+2} - U_N)\end{array}}{\begin{array}{l}2(U_N - U_{N+1})(V_{N+1} - V_{N+2}) - \\ 2(U_{N+1} - U_{N+2})(V_N - V_{N+1})\end{array}}$$

$$r1 = (U_1 - U_{N+1})(U_1 - U_{N+1}) + (V_1 - V_{N+1})(V_1 - V_{N+1})$$ [Equation 5]

The second circumcircle calculator 1121 receives the UV coordinate values $(U_N, V_N)$, $(U_{N+}, V_{N+1})$ and $(U_{N+2}, V_{N+2})$ of cross-color artifacts $C'_N$, $C'_{N+1}$ and $C'_{N+2}$ of chrominance signals separated from the second, third and fourth frame data and calculates the radius r2 of a circle circumscribing the UV coordinate values $(U_N, V_N)$, $(U_{N+1}, V_{N+1})$ and $(U_{N+2}, V_{N+2})$. The Nth circumcircle calculator 1121 receives the UV coordinate values $(U_N, V_N)$, $(U_{N+1}, V_{N+1})$ and $(U_{N+2}, V_{N+2})$ of cross-color artifacts $C'_N$, $C'_{N+1}$ and $C'_{N+2}$ of chrominance signals separated from the Nth, (N+1)th and (N+2)th frame data and calculates the radius rN of a circle circumscribing the UV coordinate values $(U_N, V_N)$, $(U_{N+1}, V_{N+1})$ and $(U_{N+2}, V_{N+2})$ when it is assumed that the last frame is the (N+2)th frame.

The selector 1130 receives the radiuses r1, r2, . . . , rN of the first through Nth circumcircles and selects the circumcircle having the smallest radius and outputs the center of the selected circumcircle. The center of the selected circumcircle having the smallest radius is adopted as an actual chrominance signal.

Accordingly, the cross-color artifact removing circuit 1100 of the present invention transforms chrominance signals respectively separated from at least three continuous frames of a composite video signal into UV coordinate values, calculates the radiuses and centers of circumcircles circumscribing the UV coordinate values, and selects the circumcircle having the smallest radius from the circumcircles to output the center of the selected circumcircle as the actual chrominance signal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed:
1. A cross-color artifact removing circuit comprising:
2-dimensional Y/C separators respectively receiving at least three frames of a composite video signal and respectively separating chrominance signals from the frames; and
a circumcircle calculator transforming the separated chrominance signals output from the 2-dimensional Y/C separators into UV coordinate values and calculating the radius and center of a circumcircle circumscribing the UV coordinate values,
wherein the center of the circumcircle is output as an actual chrominance signal to minimize cross-color artifact.
2. The circuit of claim 1, wherein each of the 2-dimensional Y/C separators in the NTSC standard comprises:
a low pass filter receiving the composite video signal and separating a frequency of lower than 3.0 MHz as a luminance signal; and
a high pass filter receiving the composite video signal and separating a frequency of higher than 3.0 MHz as the chrominance signal.
3. The circuit of claim 1, wherein each of the 2-dimensional Y/C separators in the PAL standard comprises:
a low pass filter receiving the composite video signal and separating a frequency of lower than 3.8 MHz as a luminance signal; and
a high pass filter receiving the composite video signal and separating a frequency of higher than 3.8 MHz as the chrominance signal.
4. The circuit of claim 1, wherein, when the UV coordinate values are $(U_N, V_N)$, $(U_{N+1}, V_{N+1})$ and $(U_{N+2}, V_{N+2})$, the center (U1, V1) and the radius R1 of the circumcircle, calculated by the circumcircle calculator, are represented as follows.

$$U1 = \frac{\begin{array}{c}(V_{N+1} - V_{N+2})(U_N - U_{N+1})(U_N + U_{N+1}) - \\ (V_N - V_{N+1})(U_{N+1} - U_{N+2})(U_{N+1} + U_{N+2}) - \\ (V_N - V_{N+1})(V_{N+1} - V_{N+2})(V_{N+2} - V_N)\end{array}}{\begin{array}{c}2(U_N - U_{N+1})(V_{N+1} - V_{N+2}) - \\ 2(U_{N+1} - U_{N+2})(V_N - V_{N+1})\end{array}}$$

$$V1 = \frac{\begin{array}{c}(U_{N+1} - U_{N+2})(V_N - V_{N+1})(V_N + V_{N+1}) - \\ (U_N - U_{N+1})(V_{N+1} - V_{N+2})(V_{N+1} + V_{N+2}) - \\ (U_N - U_{N+1})(U_{N+1} - U_{N+2})(U_{N+2} - U_N)\end{array}}{\begin{array}{c}2(U_N - U_{N+1})(V_{N+1} - V_{N+2}) - \\ 2(U_{N+1} - U_{N+2})(V_N - V_{N+1})\end{array}}$$

$$r1 = (U_1 - U_{N+1})(U_1 - U_{N+1}) + (V_1 - V_{N+1})(V_1 - V_{N+1})$$

5. A cross-color artifact removing circuit comprising:

a first 2-dimensional Y/C separator receiving the Nth frame ($N \geq 1$) of a composite video signal and separating a first chrominance signal from the Nth frame;

a second 2-dimensional Y/C separator receiving the (N+1)th frame of the composite video signal and separating a second chrominance signal from the (N+1)th frame;

a third 2-dimensional Y/C separator receiving the (N+2)th frame of the composite video signal and separating a third chrominance signal from the (N+2)th frame;

a plurality of circumcircle calculators transforming the first, second and third chrominance signals separated from every three continuous frames of the composite video signal into UV coordinate values and calculating the radiuses of circumcircles circumscribing the UV coordinate values for every three continuous frames; and a selector selecting the circumcircle having the smallest radius from the circumcircles and outputting the center of the selected circumcircle as an actual chrominance signal.

6. The circuit of claim 5, wherein each of the first, second and third 2-dimensional Y/C separators in the NTSC standard comprises:

a low pass filter receiving the composite video signal and separating a frequency of lower than 3.0 MHz as a luminance signal; and a high pass filter receiving the composite video signal and separating a frequency of higher than 3.0 MHz as the chrominance signal.

7. The circuit of claim 5, wherein each of the first, second and third 2-dimensional Y/C separators in the PAL standard comprises:

a low pass filter receiving the composite video signal and separating a frequency of lower than 3.0 MHz as a luminance signal; and a high pass filter receiving the composite video signal and separating a frequency of higher than 3.0 MHz as the chrominance signal.

8. The circuit of claim 5, wherein, when the UV coordinate values of chrominance signals separated from three continuous frames are ($U_N$, $V_N$), ($U_{N+1}$, $V_{N+1}$) and ($U_{N+2}$, $V_{N+2}$), the center (U1, V1) and the radius R1 of the circumcircle, calculated by each of the circumcircle calculators, are represented as follows.

$$U1 = \frac{\begin{array}{c}(V_{N+1} - V_{N+2})(U_N - U_{N+1})(U_N + U_{N+1}) - \\ (V_N - V_{N+1})(U_{N+1} - U_{N+2})(U_{N+1} + U_{N+2}) - \\ (V_N - V_{N+1})(V_{N+1} - V_{N+2})(V_{N+2} - V_N)\end{array}}{\begin{array}{c}2(U_N - U_{N+1})(V_{N+1} - V_{N+2}) - \\ 2(U_{N+1} - U_{N+2})(V_N - V_{N+1})\end{array}}$$

$$r1 = (U_1 - U_{N+1})(U_1 - U_{N+1}) + (V_1 - V_{N+1})(V_1 - V_{N+1})$$

9. A cross-color artifact removing method comprising:

receiving at least three continuous frames of a composite video signal;

respectively separating chrominance signals from the three continuous frames;

transforming the chrominance signals separated from the frames into UV coordinate values;

calculating the radiuses and centers of circumcircles circumscribing the UV coordinate values; and selecting the circumcircle having the smallest radius from the circumcircles and outputting the center of the selected circumcircle as an actual chrominance signal.

10. The method of claim 9, wherein the chrominance signals are separated using a high pass filter that receives the composite video signal and filters a frequency of higher than 3.0 MHz in an NTSC system.

11. The method of claim 9, wherein the chrominance signals are separated using a high pass filter that receives the composite video signal and filters a frequency of higher than 3.8 MHz in a PAL system.

12. The method of claim 9, wherein, when the UV coordinate values of chrominance signals separated from the three continuous frames are ($U_N$, $V_N$), ($U_{N+1}$, $V_{N+1}$) and ($U_{N+2}$, $V_{N+2}$), the center (U1, V1) and the radius R1 of each circumcircle are represented as follows.

$$U1 = \frac{\begin{array}{c}(V_{N+1} - V_{N+2})(U_N - U_{N+1})(U_N + U_{N+1}) - \\ (V_N - V_{N+1})(U_{N+1} - U_{N+2})(U_{N+1} + U_{N+2}) - \\ (V_N - V_{N+1})(V_{N+1} - V_{N+2})(V_{N+2} - V_N)\end{array}}{\begin{array}{c}2(U_N - U_{N+1})(V_{N+1} - V_{N+2}) - \\ 2(U_{N+1} - U_{N+2})(V_N - V_{N+1})\end{array}}$$

$$r1 = (U_1 - U_{N+1})(U_1 - U_{N+1}) + (V_1 - V_{N+1})(V_1 - V_{N+1})$$

13. A method of reducing cross-color artifacts in video data, comprising:

determining a smallest radius of at least three circumcircles circumscribing UV coordinate values corresponding to at least three contiguous frames of video data in a composite video signal, wherein determining a smallest radius of at least three circumcircles circumscribing UV coordinate values comprises:

separating a first chrominance signal from a first video frame of data;

separating a second chrominance signal from a second video frame of data;

separating a third chrominance signal from a third video frame of data; and providing the first, second, and third chrominance signals to a first circumcircle calculator to determine first, second, and third radii for respective circumcircles corresponding to the first, second, and third chrominance signals.

14. A chrominance separation circuit comprising:
three luminance/chrominance (Y/C) separator circuits each configured to provide sets of chrominance coordinates based on a respective three contiguous composite video frames;
a first circumcircle calculator circuit coupled to the three Y/C separator circuits and configured to provide a circumcircle for a set of chrominance coordinates corresponding to the first, second and third contiguous composite video frames; and
a second circumcircle calculator circuit coupled to the three Y/C separator circuits and configured to provide a circumcircle for a set of chrominance coordinates corresponding to the second and third contiguous composite video frames and a fourth contiguous composite video frame.

15. A chrominance separation circuit according to claim 14 further comprising:
a third circumcircle calculator circuit coupled to the three Y/C separator circuits and configured to provide a circumcircle for a set of chrominance coordinates corresponding to the third and fourth contiguous composite video frames and a fifth contiguous composite video frame.

16. A chrominance separation circuit according to claim 15 further comprising:
a selector circuit coupled to the first, second, and third circumcircle calculator circuits and configured to select a minimum radius among the circumcircles.

17. A chrominance separation circuit according to claim 14 wherein the three Y/C separator circuits and the first and second circumcircle calculator circuits comprise a highpass filter circuit configured to provide the chrominance signals including a narrowband luminance signal.

* * * * *